United States Patent
Godet et al.

(10) Patent No.: US 12,066,286 B2
(45) Date of Patent: Aug. 20, 2024

(54) DETECTION OF A GEOMETRIC ANOMALY OF A VEHICLE WHEEL

(71) Applicant: Continental Automotive Technologies GmbH, Hannover (DE)

(72) Inventors: Sylvain Godet, Toulouse (FR); Stéphane Billy, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/280,785

(22) PCT Filed: Mar. 7, 2022

(86) PCT No.: PCT/EP2022/055709
§ 371 (c)(1),
(2) Date: Sep. 7, 2023

(87) PCT Pub. No.: WO2022/189337
PCT Pub. Date: Sep. 15, 2022

(65) Prior Publication Data
US 2024/0085176 A1    Mar. 14, 2024

(30) Foreign Application Priority Data
Mar. 9, 2021  (FR) ...................................... 2102293

(51) Int. Cl.
*G01B 21/26*   (2006.01)
*B60C 23/04*   (2006.01)

(52) U.S. Cl.
CPC .......... *G01B 21/26* (2013.01); *B60C 23/0488* (2013.01)

(58) Field of Classification Search
CPC .............................. G01B 21/26; B60C 23/0488
See application file for complete search history.

(56) References Cited

U.S. PATENT DOCUMENTS

| 5,925,083 A * | 7/1999 | Ackermann | ............. | B62D 6/00 |
|||||280/211|
| 6,275,753 B1 * | 8/2001 | Kyrtsos | .................. | G01B 21/26 |
|||||701/32.8|

(Continued)

FOREIGN PATENT DOCUMENTS

| DE | 102010055378 A1 | 8/2011 |
| DE | 102017217309 A1 | 3/2019 |

OTHER PUBLICATIONS

FXTH87 Family Evaluation Design Reference Manual, Document No. FXTH87EDRM, Rev. 1.0, Sep. 2015, 32 pages, Freescale.

(Continued)

*Primary Examiner* — Yaritza Guadalupe-McCall
(74) *Attorney, Agent, or Firm* — Buchanan, Ingersoll & Rooney, PC

(57) ABSTRACT

A computer for a motor vehicle. The vehicle including a plurality of wheels, at least one of the wheels including a sensor for measuring at least one value of a "pitch" parameter, enabling the computer to determine a "pitch" coordinate of the sensor along a predetermined "pitch" axis orthogonal to the direction of movement of the vehicle and parallel to the plane of the road. The computer being capable of receiving from the sensor at least one value of the pitch parameter, determining at least one pitch coordinate of the sensor on the basis of the at least one value received, detecting a geometric anomaly in the wheel including the sensor when at least one determined pitch coordinate is outside a first predetermined range of values of coordinates on the pitch axis.

17 Claims, 10 Drawing Sheets

(56) References Cited

U.S. PATENT DOCUMENTS

| | | | | |
|---|---|---|---|---|
| 6,894,771 | B1* | 5/2005 | Dorrance | G01B 11/2755 356/139.09 |
| 7,212,105 | B2* | 5/2007 | Okubo | B60C 23/0408 340/447 |
| 7,379,800 | B2* | 5/2008 | Breed | B60C 23/0425 324/207.2 |
| 7,415,324 | B2* | 8/2008 | Healy | G01B 21/26 701/1 |
| 7,603,894 | B2* | 10/2009 | Breed | B60C 23/0413 73/146 |
| 7,873,449 | B2* | 1/2011 | Bujak | B60C 23/0481 73/146 |
| 8,326,480 | B2* | 12/2012 | Kobe | B60C 23/061 701/72 |
| 8,565,993 | B2* | 10/2013 | Lu | B60T 8/1755 701/29.2 |
| 8,825,267 | B2* | 9/2014 | Gerdin | B60C 23/061 73/146 |
| 9,212,907 | B2* | 12/2015 | D'Agostino | G01B 11/2755 |
| 10,583,698 | B2* | 3/2020 | Tsujita | G01L 17/00 |
| 10,780,892 | B2* | 9/2020 | Godet | B60W 40/10 |
| 11,065,923 | B2* | 7/2021 | Loeffler | B60C 23/0454 |
| 2006/0267750 | A1* | 11/2006 | Lu | B60C 23/062 280/5.502 |
| 2007/0245578 | A1* | 10/2007 | Clark | G01C 9/06 33/365 |
| 2010/0271191 | A1* | 10/2010 | de Graff | B60C 23/0493 73/146 |
| 2015/0221144 | A1* | 8/2015 | Kourtev | G07C 5/0808 701/34.4 |
| 2016/0033367 | A1* | 2/2016 | Unterreiner | G01L 17/005 73/8 |
| 2016/0201277 | A1* | 7/2016 | Svantesson | E01C 23/01 73/146 |
| 2021/0370958 | A1* | 12/2021 | Moshchuk | B60W 40/105 |
| 2022/0414933 | A1* | 12/2022 | Sung | G06T 7/73 |

OTHER PUBLICATIONS

Suspension Geometry, Wikipedia, Aug. 31, 2022, 14 pages, Retrieved from the Internet: https://fr.wikipedia.org/w/index.php?title=Geometrie de suspension&oldid=196585843, with translation.

International Search Report and Written Opinion for International Application No. PCT/EP2022/055709, mailed Jun. 21, 2022, 12 pages.

International Search Report and Written Opinion for International Application No. PCT/EP2022/055709, mailed Jun. 21, 2022, 10 pages (French).

French Search Report for French Application No. 2102293, dated Nov. 18, 2021 with translation, 8 pages.

English Translation of the Written Opinion for International Application No. PCT/EP2022/055709, mailed Jun. 21, 2022, 4 pages.

\* cited by examiner

DETECTION OF A GEOMETRIC ANOMALY OF A VEHICLE WHEEL

CROSS REFERENCE TO RELATED APPLICATIONS

This application is the U.S. National Phase application of PCT International Application No. PCT/EP2022/055709, filed Mar. 7, 2022, which claims priority to French Patent Application No. 2102293, filed Mar. 9, 2021, the contents of such applications being incorporated by reference herein.

FIELD OF THE INVENTION

The invention relates to the field of motor vehicles, and more particularly to a computer and to a method for detecting a geometric anomaly of a vehicle wheel.

BACKGROUND OF THE INVENTION

It is currently known to fit various sensors in the wheels of a motor vehicle. For example, it is known to fit a temperature and pressure sensor, commonly referred to as a TPMS, for "Tire Pressure Monitoring System", which is, for example, fitted on the inflation valve of the tire of the wheel.

It is also known that a vehicle wheel may exhibit certain geometric anomalies, relating for example to alignment, to camber, or to the tightening of the wheel bolts.

Thus, with reference to FIGS. 1 and 2, the vehicle being stationary, the wheel exhibits an alignment anomaly when viewed from above, the plane perpendicular to the axis of rotation of the wheel, called the "wheel plane", lying at an angle to the vertical plane extending along the axis of movement of the vehicle, called the "roll axis" X of the vehicle.

Similarly, with reference to FIGS. 3 and 4, the vehicle again being stationary, the wheel exhibits a camber anomaly when viewed from the front of the vehicle, the wheel plane lying at an angle to the vertical plane extending along the yaw axis Z of the vehicle.

A geometric anomaly may reduce driving comfort, notably by causing vibration in the steering wheel or by preventing correct centering of the steering wheel when the vehicle is traveling in a straight line, which may prove dangerous for the vehicle's occupants. Moreover, a geometric anomaly may result in a significant increase in fuel consumption and tire wear. This is because, if a geometric anomaly is present, the tires are worn in a non-uniform manner on their edges. Wear that is not uniformly defined may fail to be detected. If a worn tire is not changed in good time, there will be a continuing risk of poor road holding and/or tire blow-out, which further endangers the occupants of the vehicle. Geometric anomalies must therefore be detected as soon as possible.

The driver might suspect the presence of a geometric anomaly in his vehicle, notably if he feels the steering wheel vibrate while he is driving the vehicle. To confirm his suspicions, the vehicle user must take his vehicle to a car mechanic, so that a qualified person can inspect the vehicle's tires.

However, it is possible that the driver may not perceive any problems while driving the vehicle. Thus, if the driver does not take his vehicle to a car mechanic, the geometric anomalies cannot be detected.

Therefore, there is a need for a solution that makes it possible to at least partly overcome these drawbacks.

SUMMARY OF THE INVENTION

An aspect of the invention relates to a computer for a motor vehicle, said vehicle comprising a plurality of wheels enabling the vehicle to move on a road, at least one of said wheels comprising a sensor for measuring at least one value of a "pitch" parameter, enabling the computer to determine a "pitch" coordinate of said sensor along a predetermined "pitch" axis orthogonal to the direction of movement of the vehicle and parallel to the plane of the road, relative to a predetermined reference of said pitch axis, the computer being capable of:
  a) receiving from the sensor at least one value of the at least one pitch parameter,
  b) determining at least one pitch coordinate of the sensor relative to the predetermined reference of the pitch axis on the basis of the at least one value received,
  c) detecting a geometric anomaly in the wheel including said sensor when at least one determined pitch coordinate is outside a first predetermined range of values of coordinates on the pitch axis, centered on the predetermined reference of said pitch axis between a minimum and a maximum,
  d) warning the vehicle driver, by sending a warning message, when an anomaly has been detected.

Thus the computer according to an aspect of the invention enables a geometric anomaly to be detected in at least one wheel of the vehicle and enables the driver to be warned of this, making the vehicle safer for its occupants. The computer according to an aspect of the invention enables the vehicle driver to know when an intervention by a qualified person is necessary to remedy the at least one detected geometric anomaly.

The sensor is preferably capable of measuring at least two pitch parameter values and at least two values of a "yaw" parameter, each yaw parameter value enabling the computer to determine the "yaw" coordinate of said sensor along a predetermined "yaw" axis orthogonal to the direction of movement of the vehicle and orthogonal to the plane of the road relative to a predetermined reference of said yaw axis, the computer being capable of:
  a) receiving from the sensor at least two values of the pitch parameter and at least two values of the yaw parameter,
  b) determining at least two pitch coordinates based on the at least two pitch parameter values received and at least two yaw coordinates based on the at least two yaw parameter values received,
  c) defining at least two positions of the sensor, each position being defined in the plane including the pitch axis and the yaw axis by a pitch coordinate and a yaw coordinate which have been determined,
  d) detecting a tightening anomaly of the wheel comprising said sensor, when:
  i) at least one position is defined such that its pitch coordinate is greater than the maximum of the first predetermined range and its yaw coordinate is greater than the maximum of a second predetermined range of coordinate values on the yaw axis, centered on the center of the wheel between a minimum and a maximum, and
  at least one position is defined such that its pitch coordinate is less than the minimum of the first predetermined range and its yaw coordinate is greater than the maximum of the second predetermined range, or:
  ii) at least one position is defined such that its pitch coordinate is greater than the maximum of the first predetermined range and its yaw coordinate is less than the minimum of a second predetermined range of position values on the yaw axis, centered on the center of the wheel between a minimum and a maximum, and at least one position is defined such that its pitch coordinate is less than the minimum of the first predetermined range and its yaw coordinate is less than the minimum of the second predetermined range.

Preferably, the computer is configured for detecting a camber anomaly of the wheel including said sensor, when:
i) at least one position is defined such that its pitch coordinate is greater than the maximum of the first predetermined range and its yaw coordinate is greater than the maximum of the second predetermined range, and at least one position is defined such that its pitch coordinate is less than the minimum of the first predetermined range and its yaw coordinate is less than the minimum of the second predetermined range, or:
ii) at least one position is defined such that its pitch coordinate is greater than the maximum of the first predetermined range and its yaw coordinate is less than the minimum of the second predetermined range, and at least one position is defined such that its pitch coordinate is less than the minimum of the first predetermined range and its yaw coordinate is greater than the maximum of the second predetermined range.

According to a second embodiment, each sensor is capable of measuring at least two pitch parameter values, the vehicle comprises at least a second sensor, each second sensor being fitted facing a wheel including a sensor and being configured for measuring at least two values of a "yaw" parameter, each yaw parameter value enabling the computer to determine the "yaw" coordinate of said sensor along a predetermined "yaw" axis orthogonal to the direction of movement of the vehicle and orthogonal to the plane of the road relative to a predetermined reference of said yaw axis, and the computer is capable of:
a) receiving at least two values of the pitch parameter from the sensor and at least two values of the yaw parameter from the second sensor,
b) determining at least two pitch coordinates based on the at least two values of pitch parameter received and at least two yaw coordinates based on the at least two values of yaw parameter received,
c) defining at least two positions of the sensor, each position being defined in the plane including the pitch axis and the yaw axis by a pitch coordinate and by a yaw coordinate which have been determined,
d) detecting a tightening anomaly of the wheel including said sensor and said second sensor, when:
i) at least one position is defined such that its pitch coordinate is greater than the maximum of the first predetermined range and its yaw coordinate is greater than the maximum of a second predetermined range of coordinate values on the yaw axis, centered on the center of the wheel between a minimum and a maximum, and at least one position is defined such that its pitch coordinate is less than the minimum of the first predetermined range and its yaw coordinate is greater than the maximum of the second predetermined range, or:
ii) at least one position is defined such that its pitch coordinate is greater than the maximum of the first predetermined range and its yaw coordinate is less than the minimum of a second predetermined range of position values on the yaw axis, centered on the center of the wheel between a minimum and a maximum, and at least one position is defined such that its pitch coordinate is less than the minimum of the first predetermined range and its yaw coordinate is less than the minimum of the second predetermined range.

According to this second embodiment, the computer is configured for detecting a camber anomaly of the wheel including said sensor, when:
i) at least one position is defined such that its pitch coordinate is greater than the maximum of the first predetermined range and its yaw coordinate is greater than the maximum of the second predetermined range, and at least one position is defined such that its pitch coordinate is less than the minimum of the first predetermined range and its yaw coordinate is less than the minimum of the second predetermined range, or:
ii) at least one position is defined such that its pitch coordinate is greater than the maximum of the first predetermined range and its yaw coordinate is less than the minimum of the second predetermined range, and at least one position is defined such that its pitch coordinate is less than the minimum of the first predetermined range and its yaw coordinate is greater than the maximum of the second predetermined range.

The sensor is preferably capable of measuring at least two pitch parameter values and at least two values of a "roll" parameter, each roll parameter value enabling the computer to determine the "roll" coordinate of said sensor along a predetermined "roll" axis parallel to the direction of movement of the vehicle relative to a predetermined reference of said roll axis, and the computer is capable of:
a) receiving from the sensor at least two values of the pitch parameter and at least two values of the roll parameter,
b) determining at least two pitch coordinates based on the at least two values of pitch parameter received and at least two roll coordinates based on the at least two values of roll parameter received,
c) defining at least two positions of the sensor, each position being defined in the plane including the pitch axis and the roll axis by a pitch coordinate and by a roll coordinate which have been determined,
d) detecting an alignment anomaly of the wheel comprising said sensor, when:
i) at least one position is defined such that its pitch coordinate is greater than the maximum of the first predetermined range and its roll coordinate is greater than the maximum of a third predetermined range of coordinate values on the roll axis, centered on the center of the wheel between a minimum and a maximum, and at least one position is defined such that its pitch coordinate is less than the minimum of the first predetermined range and its roll coordinate is less than the minimum of the third predetermined range, or:
ii) at least one position is defined such that its pitch coordinate is greater than the maximum of the first predetermined range and its roll coordinate is less than the minimum of a third predetermined range of coordinate values on the roll axis, centered on the center of the wheel between a minimum and a maximum, and at least one position is defined such that its pitch coordinate is less than the minimum of the first predetermined range and its roll coordinate is greater than the maximum of the third predetermined range.

Preferably, the sensor is an acceleration sensor.

According to a second embodiment, the second sensor is a sensor of the wheel rotation speed.

Preferably, the second sensor is a sensor of an anti-lock braking system of the vehicle wheels.

An aspect of the invention also relates to a vehicle comprising a plurality of wheels enabling the vehicle to move on a road, said vehicle comprising a computer as described above, at least one of said wheels comprising a sensor for measuring at least one "pitch" parameter, enabling the computer to determine the "pitch" coordinate of said sensor along a predetermined "pitch" axis orthogonal to the direction of movement of the vehicle and parallel to the plane of the road, relative to a predetermined reference of said pitch axis.

An aspect of the invention also relates to a method for detecting a geometric anomaly of a vehicle wheel, implemented by a computer as described above, the method being noteworthy in that it comprises the steps of:
a) receiving at least one value of the at least one pitch parameter sent by at least one sensor,
b) determining at least one pitch coordinate relative to the predetermined reference of the pitch axis on the basis of the at least one value received,
c) detecting a geometric anomaly in the wheel including said sensor when at least one determined pitch coordinate is outside a first predetermined range of values of coordinates on the pitch axis, centered on the predetermined reference of said pitch axis,
d) warning, by sending a warning message to the driver of the vehicle, when an anomaly has been detected.

An aspect of the invention also relates to a computer program product, noteworthy in that it comprises a set of program code instructions that, when executed by one or more processors, configure the one or more processors to implement a method as described above.

BRIEF DESCRIPTION OF THE DRAWINGS

Other features and advantages of aspects of the invention will become more clearly apparent from reading the description that follows. This description is purely illustrative and should be read with reference to the appended drawings, in which.

DETAILED DESCRIPTION OF THE PREFERRED EMBODIMENTS

An aspect of the invention will be described in the light of implementation in a motor vehicle.

Figure 5:
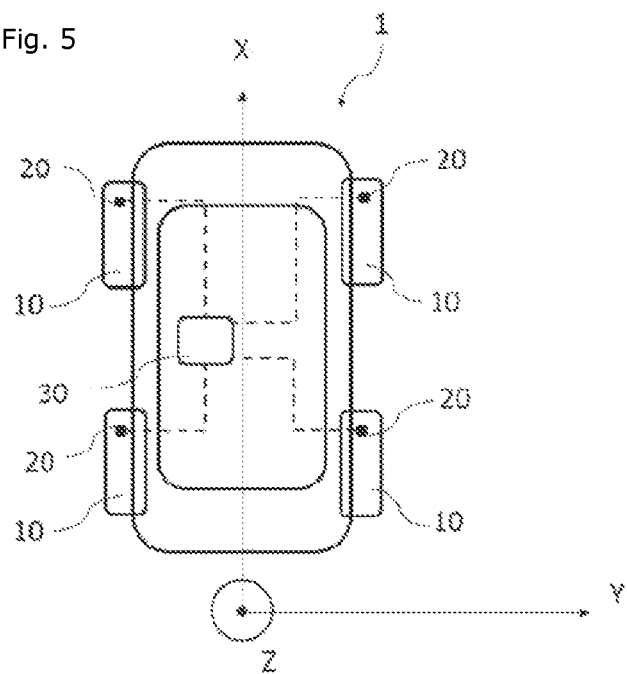
FIG. 5 depicts a top view of a vehicle according to an aspect of the invention.

With reference to FIG. 5, the vehicle 1 is notably defined in a three-dimensional orthogonal reference frame in which:
a) a first axis, called the "pitch axis" Y, is defined as a predetermined axis orthogonal to the direction of movement of the vehicle 1 and parallel to the plane of the road,
b) a second axis, called the "yaw axis" Z, is defined as a predetermined axis orthogonal to the direction of movement of the vehicle 1 and orthogonal to the plane of the road,
c) a third axis, called the "roll axis" X, is defined as an axis parallel to the direction of movement of the vehicle 1.

The vehicle 1 comprises a plurality of wheels 10 for movement on a road, and a computer 30. For example, the vehicle 1 comprises four wheels 10.

The wheels 10 are also defined according to said three-dimensional reference frame.

At least one of said wheels 10 comprises a sensor 20. Again with reference to FIG. 5, each wheel 10 of the vehicle 1 preferably comprises a sensor 20.

Thus, when the vehicle 1 is moving, each wheel 10 starts to rotate in the plane perpendicular to the axis of rotation of said wheel 10, called the "wheel plane". Thus each sensor 20 fitted in a wheel 10 in rotation also moves in the plane of said wheel 10.

Figure 6:
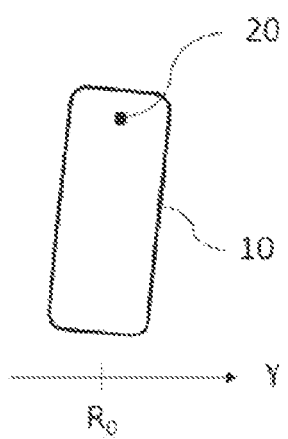
FIG. 6 depicts a wheel of the vehicle depicted in FIG. 5, along a pitch axis.

With reference to FIG. 6, according to a first embodiment, the sensor 20 is capable of measuring at least one value of the "pitch" parameter, enabling the computer 30 to determine the coordinate on the pitch axis Y, called the "pitch coordinate", of said sensor 20 relative to a predetermined reference R0.

The predetermined reference R0 corresponds, notably, to the point on the pitch axis Y located in the plane of the wheel 10 comprising said sensor 20, when the wheel 10 is correctly mounted on the vehicle 1. "Correctly mounted" is taken to mean a wheel mounted on the hub of a vehicle without any geometric anomaly, in other words without any alignment fault or camber fault, and with tightened nuts.

The pitch parameter value may, for example, be a value of acceleration of the wheel 10.

Figure 7:
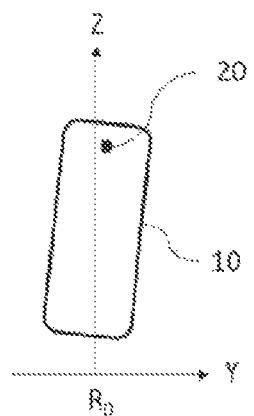
FIG. 7 depicts a wheel of the vehicle shown in FIG. 5, in a plane defined by a pitch axis and a yaw axis.

With reference to FIG. 7, according to a second embodiment, the sensor 20 is also capable of measuring at least one value of a "yaw" parameter, enabling the computer to determine the coordinate on the yaw axis Z, called the "yaw coordinate", of said sensor 20 relative to the predetermined reference R0.

The yaw parameter value may also be a value of acceleration of the wheel 10.

Figure 8:
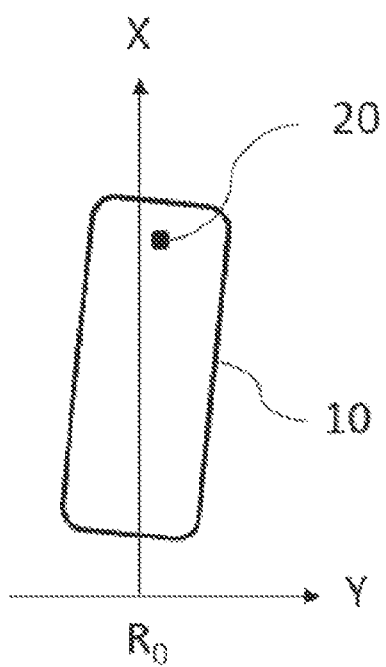
FIG. 8 depicts a wheel of the vehicle shown in FIG. 5, in a plane defined by a pitch axis and a roll axis.

With reference to FIG. 8, according to a third embodiment, the sensor 20 is capable of measuring at least one value of a pitch parameter and of measuring at least one value of a "roll" parameter, enabling the computer to determine the coordinate on the roll axis X, called the "roll coordinate", of said sensor 20 relative to the predetermined reference R0.

The roll parameter value may, notably, be a value of acceleration of the wheel 10.

Figure 9:
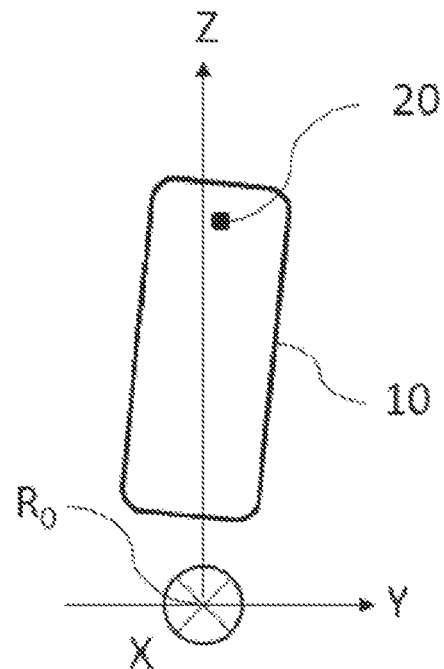
FIG. 9 depicts a wheel of the vehicle shown in FIG. 5, in a three-dimensional reference frame defined by a pitch axis, a yaw axis and a roll axis.

With reference to FIG. 9, according to a fourth embodiment, the sensor 20 is capable of measuring at least one value of the yaw parameter, at least one value of the roll parameter, and at least one value of the pitch parameter.

The sensor 20 is also capable of sending the at least one measured value of the parameter, that is to say the measured pitch parameter, to the computer 30.

Additionally, according to the second and fourth embodiments, the sensor 20 is also capable of sending the at least one measured yaw parameter value to the computer 30.

Furthermore, according to the third and fourth embodiments, the sensor 20 is also capable of sending the at least one measured roll parameter value to the computer 30.

Additionally, the sensor 20, in any embodiment, is configured for sending at least one pitch, yaw or roll parameter value in association with an identifier, enabling the computer 30 to identify the sensor 20 from which said parameter value has been sent.

The sensor 20 may be an accelerometer, notably the accelerometer of the TPMS (Tire Pressure Monitoring System) sensor, making it possible, notably, to measure the pressure of the tire of the wheel 10 of the vehicle 1 in which the TPMS sensor is fitted. The TPMS sensor is already known to those skilled in the art and therefore will not be detailed further here.

According to another embodiment, the vehicle 1 comprises at least a second sensor. More precisely, each second sensor is fitted on the vehicle 1, facing a wheel 10 of the vehicle 1 comprising a sensor 20.

Preferably, the vehicle 1 comprises as many second sensors as there are wheels 10.

For a wheel in rotation, the second sensor is notably capable of measuring at least one yaw parameter, enabling the computer 30 to determine the yaw coordinate of the sensor 20 fitted in the wheel 10.

The yaw parameter value may be a value of rotation speed of the wheel 10.

The second sensor may be a sensor of the rotation speed of the vehicle 10, used for example by an anti-lock braking system of the wheels 10 with which the vehicle is fitted and which is commonly called an "ABS" system by those skilled in the art.

The second sensor is capable of sending each measured yaw parameter value to the computer 30, in association with an identifier, enabling the computer 30 to identify the second sensor from which said yaw parameter value has been sent.

Again with reference to FIG. 5, the computer 30 is thus fitted in the vehicle 1, and notably in a position substantially central to the interior of the vehicle 1.

The computer 30 is connected to each sensor 20 fitted in a wheel 10 of the vehicle 1. Preferably, since the vehicle 1 comprises a plurality of wheels 10 and each wheel 10 of the vehicle 1 comprises a sensor 20, the computer 30 is connected to a plurality of sensors 20.

Notably, since the vehicle 1 comprises four wheels 10, the computer 30 is connected to four sensors 20.

Additionally, the computer 30 is connected to each sensor 20 by a wireless connecting link. For example, the computer 30 is connected to each sensor 20 via a radio frequency connection.

Furthermore, the computer 30 may also be connected to the at least one second sensor 20 via a second connecting link, notably of the radio frequency type, for example an ultra high frequency link at 315 MHz or 433 MHz, or a Bluetooth low energy connecting link at 2.4 GHz.

The computer 30 is thus configured for receiving at least one value of a parameter measured and sent by at least one sensor 20 via the connecting link and/or by at least one second sensor via the second connecting link.

More precisely, the computer 30 is capable of receiving at least one pitch parameter value measured and sent by at least one sensor 20.

Additionally, the computer 30 is also capable of receiving at least one roll parameter value and/or at least one yaw parameter value measured and sent by at least one sensor 20.

Furthermore, the computer 30 is also capable of receiving at least one yaw parameter value measured and sent by at least one second sensor.

Thus, for example, for a given wheel 10 of the vehicle 1, the computer 30 is configured for receiving the at least one pitch parameter, yaw parameter and roll parameter value measured by a sensor 20 fitted in said wheel 10.

In a further example, the computer 30 is configured for receiving the at least one pitch parameter value and the at least one roll parameter value measured by the sensor 20 and the at least one yaw parameter value measured by the second sensor.

The computer 30 is also configured for identifying the sensor 20, or the second sensor, which has sent the pitch parameter, yaw parameter or roll parameter value received. For this purpose, the computer 30 uses the identifier associated with the pitch parameter, yaw parameter or roll parameter value received. In other words, the computer 30 is configured for identifying the wheel 10 of the vehicle 1 from which the received pitch parameter, yaw parameter or roll parameter value has originated.

Additionally, again with reference to FIG. 6 and/or FIG. 9, for each pitch parameter value received, the computer 30 is configured for determining a pitch coordinate of the sensor 20 that has sent said pitch parameter value, relative to the predetermined reference R0, on the basis of the pitch parameter value received.

Similarly, with reference to FIG. 7 and/or FIG. 9, for each yaw parameter value received, the computer 30 is configured for determining a yaw coordinate of the sensor 20 relative to the predetermined reference R0, on the basis of the yaw parameter value received by the computer 30 and sent by the sensor 20 or the second sensor.

Similarly, with reference to FIG. 8 and/or FIG. 9, for each roll parameter value received, the computer 30 is configured for determining a roll coordinate of the sensor 20 that has sent said roll parameter value, relative to the predetermined reference R0, on the basis of the roll parameter value received.

Figure 10:
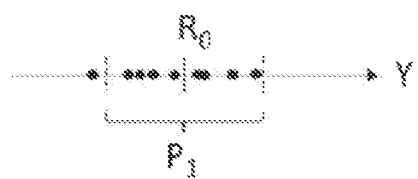
FIG. 10 depicts a plurality of pitch coordinate values determined on a pitch axis relative to a predetermined reference, according to an aspect of the invention.

With reference to FIG. 10, the computer 30 is configured for detecting a geometric anomaly in a wheel 10 of the vehicle 1 in rotation if at least one determined pitch coordinate of the sensor 20 fitted in said wheel 10 is outside a first predetermined range P1. The first predetermined range P1 denotes a set of coordinate values on a pitch axis Y centered on the predetermined reference R0 of said pitch axis Y between a minimum and a maximum. In other words, the first predetermined range P1 comprises all the values of coordinates between a minimum value and a maximum value centered on the predetermined reference R0.

The first range P1 is notably defined on the basis of the sensitivity of the sensor 20. The first range P1 is also notably determined by the manufacturer.

According to another embodiment, the first range P1 is determined when the vehicle 1 is first used. For example, during the initial running of the vehicle 1, the position of each wheel 10 is determined in the three-dimensional reference frame, and is defined as being the reference position of said wheel 10, or in other words the position in which said wheel 10 is correctly placed. Thus the first range is determined according to said determined reference position of each wheel 10.

For example, the first predetermined range P1 denotes a set of values of pitch coordinates between −2.5 mm and 2.5 mm.

The computer 30 is also configured for warning the driver of the detection of a geometric anomaly. More precisely, the computer 30 is configured for giving a warning indicating the wheel(s) 10 in which a geometric anomaly has been detected.

Notably, the computer 30 warns the driver by sending a warning message such as a sound signal in the interior of the vehicle 1, or by displaying a light signal, on the instrument panel for example, visible to the driver.

Figure 11:
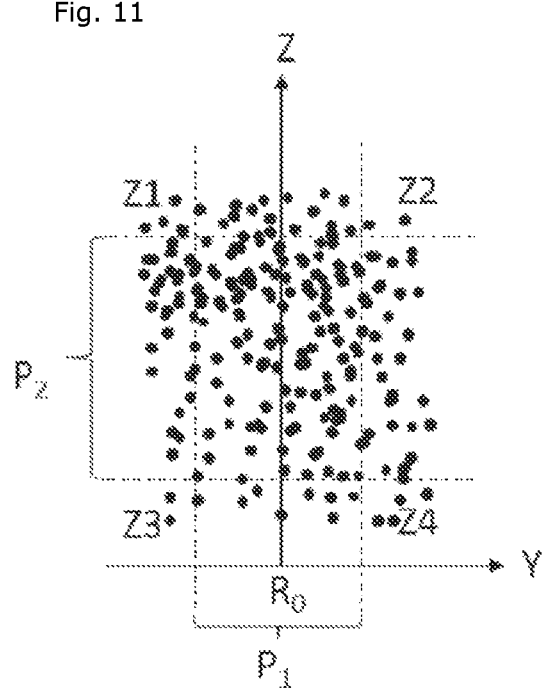
FIG. 11 depicts a plurality of positions in a plane defined by a pitch axis and a yaw axis, relative to a predetermined reference, according to an aspect of the invention.

With reference to FIG. 11, the computer 30 is configured for detecting that the geometric anomaly detected in a wheel 10 of the vehicle 1 is a tightening anomaly, on the basis of at least two positions of the sensor 20 fitted in said wheel 10 in rotation. Each position is here defined in the plane including the pitch axis Y and the yaw axis Z by a pitch coordinate and by a yaw coordinate which have been determined by the computer 30.

Here, "tightening" denotes the tightening of the bolts of the wheel 10, which enables the wheel 10 to be fastened to the corresponding hub so that the wheel 10 is immobilized relative to the hub.

Additionally, the tightening anomaly is detected on the basis of the first predetermined range P1 and a second predetermined range P2.

The second predetermined range P2 denotes a set of coordinate values on a yaw axis Z, centered on the center of the wheel 10, between a minimum and a maximum, when the wheel 10 has been correctly fitted on the vehicle 1. In other words, the first predetermined range P2 comprises all the values of yaw coordinates between a minimum value and a maximum value centered on the center of the wheel 10.

The second range P2 is notably defined on the basis of the sensitivity of the sensor 20 fitted in said wheel 10 or of the second sensor. Additionally, the second range P2 is notably determined by the manufacturer.

According to another embodiment, the second range P2 is determined when the vehicle 1 is first used. For example, the second range P2 is determined on the basis of said determined reference position of each wheel 10.

For example, the second predetermined range P2 denotes a set of values of yaw coordinates between −2.5 mm and 2.5 mm.

Again with reference to FIG. 11, in order to simplify the description, some areas are predefined in the plane comprising a pitch axis Y and a yaw axis Z:

a) a first area Z1 defines the area for which the pitch coordinate is less than the minimum value of the first predetermined range P1 and the yaw coordinate is greater than the maximum value of the second predetermined range P2, b) a second area Z2 defines the area for which the pitch coordinate is greater than the maximum value of the first predetermined range P1 and the yaw coordinate is greater than the maximum value of the second predetermined range P2, c) a third area Z3 defines the area for which the pitch coordinate is less than the minimum value of the first predetermined range P1 and the yaw coordinate is less than the minimum value of the second predetermined range P2, d) a fourth area Z4 defines the area for which the pitch coordinate is greater than the maximum value of the first predetermined range P1 and the yaw coordinate is less than the minimum value of the second predetermined range P2.

The computer 30 is configured for detecting a tightening anomaly of a wheel 10 if:

a) at least one position of the sensor 20 fitted in the wheel 10 is located in the first area Z1 and at least one position of the sensor 20 is located in the second area Z2, or b) at least one position of the sensor 20 fitted in the wheel 10 is located in the third area Z3 and at least one position of the sensor 20 is located in the fourth area Z4, or c) at least one position of the sensor 20 fitted in the wheel 10 is located in the first area Z1 and at least one position of the sensor 20 is located in the third area Z3, or d) at least one position of the sensor 20 fitted in the wheel 10 is located in the second area Z2 and at least one position of the sensor 20 is located in the fourth area Z4.

If no configuration corresponds to one of the cases described above, the computer 30 is configured for detecting whether the geometric anomaly of the wheel 10 is an alignment anomaly or a camber anomaly.

The computer 30 is also configured for warning the driver of the detection of a tightening anomaly. More precisely, the computer 30 is configured for giving a warning indicating the wheel(s) 10 in which a tightening anomaly has been detected.

Notably, the computer 30 warns the driver by sending a warning message such as a sound signal in the interior of the vehicle 1, or by displaying a light signal, on the instrument panel for example, visible to the driver.

The computer 30 is configured for detecting that the geometric anomaly detected in a wheel 10 of the vehicle 1 is a camber anomaly, on the basis of at least two positions of the sensor 20 fitted in said wheel 10 in rotation. Each position is defined, in the plane including the pitch axis Y and the yaw axis Z, by a pitch coordinate and by a yaw coordinate which have been determined by the computer 30.

The camber denotes the angle $\theta$ between the orthogonal projection of the plane of the wheel 10 in the plane defined by the pitch axis Y and the yaw axis Z, provided that this projection is a straight line, and the yaw axis Z.

Additionally, the camber anomaly is detected on the basis of the first predetermined range P1 and the second predetermined range P2.

Figure 3:
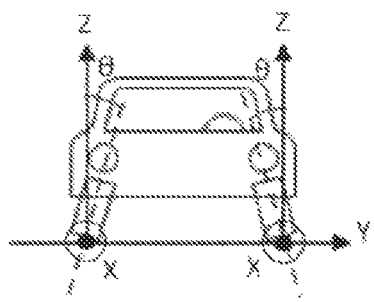
FIG. 3 depicts a front view of a vehicle exhibiting a camber anomaly.
Figure 4:
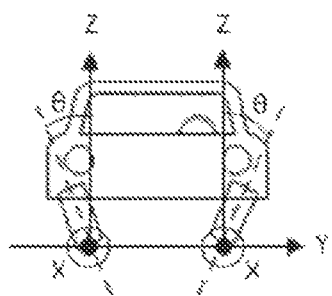
FIG. 4 depicts a front view of a vehicle exhibiting another form of camber anomaly.

The wheel 10 exhibits a camber anomaly when, in a front view of the vehicle, the projection of the plane of the wheel 10, in the plane defined by the pitch axis Y and the yaw axis Z, forms an angle θ with the yaw axis Z (as depicted in FIGS. 3 and 4, for example).

More precisely, with reference to FIG. 11, the computer 30 is configured for detecting a camber anomaly of a wheel 10 if:

a) at least one position of the sensor 20 fitted in the wheel 10 is located in the first area Z1, and at least one position of the sensor 20 is located in the fourth area Z4, and no position is located in the second area Z2 or the third area Z3, or b) at least one position of the sensor 20 fitted in the wheel 10 is located in the second area Z2, and at least one position of the sensor 20 is located in the third area Z3, and no position is located in the first area Z1 or the fourth area Z4.

The computer 30 is also configured for warning the driver of the detection of a camber anomaly. More precisely, the computer 30 is configured for giving a warning indicating the wheel(s) 10 in which a camber anomaly has been detected.

Notably, the computer 30 warns the driver by sending a warning message such as a sound signal in the interior of the vehicle 1, or by displaying a light signal, on the instrument panel for example, visible to the driver.

The computer 30 is also configured for determining whether the camber angle θ of the detected camber anomaly is positive or negative.

Figure 12:
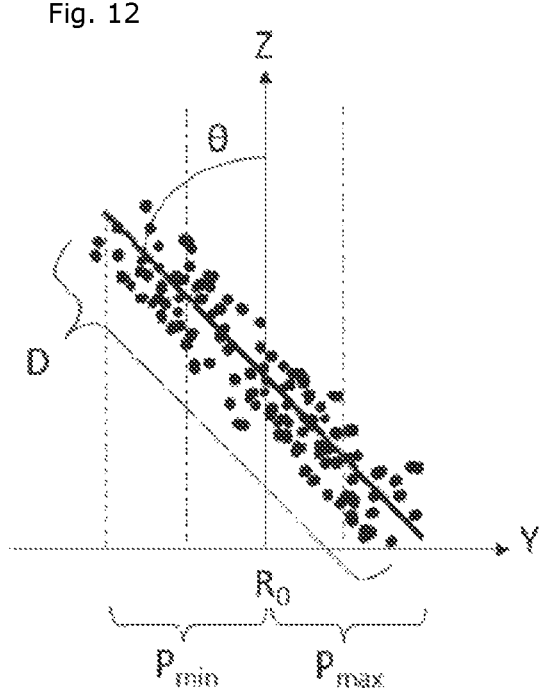
FIG. 12 depicts a plurality of positions, different from the plurality of positions depicted in FIG. 11, in a plane defined by a pitch axis and a yaw axis, relative to a predetermined reference, according to an aspect of the invention.

As explained above, the camber angle θ defines the angle between the projection of the wheel plane 10 in a plane defined by the pitch axis Y and the yaw axis Z, provided that this projection is a straight line, and the yaw axis Z, as shown in FIG. 12.

The camber angle θ is positive if the upper part of the wheel plane 10 is oriented toward the outside of the vehicle 1 (as shown in FIG. 4), and the camber angle θ is negative if the upper part of the wheel plane 10 is oriented toward the inside of the vehicle 1 (as shown in FIG. 3), Regarding the left-hand side wheels 10 of the vehicle 1, the computer 30 is configured for determining that the camber angle θ is positive if at least one position of the sensor 20 fitted in the wheel 10 is located in the first area Z1 and at least one position of the sensor 20 is located in the fourth area Z4 (and no position is located in the second area Z2 or the third area Z3).

Also regarding the left-hand side wheels 10 of the vehicle 1, the computer 30 is configured for determining that the camber angle θ is negative if at least one position of the sensor 20 fitted in the wheel 10 is located in the second area Z2 and at least one position of the sensor 20 is located in the third area Z3 (and no position is located in the first area Z1 or the fourth area Z4).

Regarding the right-hand side wheels 10 of the vehicle 1, the computer 30 is configured for determining that the camber angle θ is positive if at least one position of the sensor 20 fitted in the wheel 10 is located in the second area Z2 and at least one position of the sensor 20 is located in the third area Z3 (and no position is located in the first area Z1 or the fourth area Z4).

Also regarding the right-hand side wheels 10 of the vehicle 1, the computer 30 is configured for determining that the camber angle θ is negative if at least one position of the sensor 20 fitted in the wheel 10 is located in the first area Z1 and at least one position of the sensor 20 is located in the fourth area Z4 (and no position is located in the second area Z2 or the third area Z3).

The computer 30 is also configured for warning the driver if the camber angle θ is positive or negative. More precisely, the computer 30 is configured for giving a warning indicating the wheel(s) 10 for which the camber angle θ is positive or negative, notably via an indicator light, on the instrument panel for example, visible to the driver.

The computer 30 is also configured for determining the value of the camber angle θ of a wheel 10 of the vehicle 1 as shown in FIG. 12.

For this purpose, the computer 30 is configured for modeling, in the plane defined by the pitch axis Y and the yaw axis Z, a segment representing an estimate of the variation of the yaw coordinate of the sensor 20 on the basis of the pitch coordinate of the sensor 20. In other words, the computer 30 is configured for representing the position of the sensor 20 in the plane defined by the pitch axis Y and the yaw axis Z, each position being defined by a pitch coordinate and a yaw coordinate determined by the computer 30.

The computer 30 may use a linear regression model for this purpose.

The segment thus modeled represents the projection of the plane of the wheel 10 in the plane comprising the pitch axis Y and the yaw axis Z.

The computer 30 knows the length of the modeled segment, which corresponds to the diameter D of the wheel 10.

Since the computer 30 has modeled the segment, said computer 30 also knows the value of the minimum pitch coordinate Pmin and the maximum pitch coordinate Pmax on said modeled segment.

Thus, on the basis of the diameter D and the minimum pitch coordinate Pmin or the maximum pitch coordinate Pmax, the computer 30 is configured for determining the value of the camber angle θ, notably on the basis of the following equality:

$$\theta = \arcsin\left(\frac{P_{min}}{\frac{D}{2}}\right) \qquad \text{[Math. 1]}$$

or $$\theta = \arcsin\left(\frac{P_{max}}{\frac{D}{2}}\right). \qquad \text{[Math 2]}$$

The computer 30 is also configured for giving the driver the value of the camber angle θ. More precisely, the computer 30 is configured for giving the value of the camber angle θ for each wheel 10 exhibiting a camber anomaly, via an indicator light, displayed on the instrument panel for example, visible to the driver.

Figure 13:
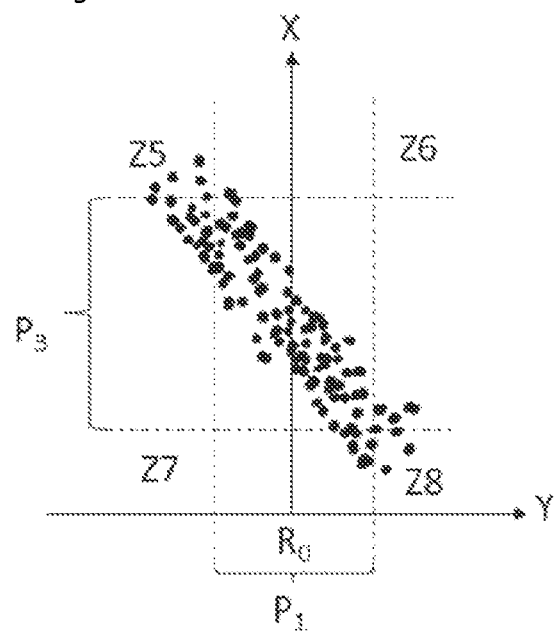
FIG. 13 depicts a plurality of positions in a plane defined by a pitch axis and a roll axis, relative to a predetermined reference, according to an aspect of the invention.

With reference to FIG. 13, the computer 30 is configured for detecting that the geometric anomaly detected in a wheel 10 of the vehicle 1 is an alignment anomaly, on the basis of at least two positions of the sensor 20 fitted in said wheel 10 in rotation, each position being defined in the plane comprising the pitch axis Y and the roll axis X by a pitch coordinate and a roll coordinate which are determined by the computer 30.

The alignment denotes, in a top view of the vehicle 1, the angle ω between the projection of the plane of the wheel 10 in the plane defined by the pitch axis Y and the roll axis X, provided that this projection is a straight line, and the roll axis X.

Additionally, the alignment anomaly is detected on the basis of the first predetermined range P1 and a third predetermined range P3.

The third predetermined range P3 denotes a set of coordinate values on a roll axis X, centered on the center of the wheel 10, between a minimum and a maximum, when the wheel 10 has been correctly fitted on the vehicle 1. In other words, the first predetermined range P3 comprises all the values of roll coordinates between a minimum value and a maximum value centered on the center of the wheel 10.

The third range P3 is notably defined on the basis of the sensitivity of the sensor 20 fitted in said wheel 10. The third range P3 is also notably determined by the manufacturer.

According to another embodiment, the third range P3 is determined when the vehicle 1 is first used. For example, the third range P3 is determined on the basis of said determined reference position of each wheel 10.

For example, the third predetermined range P3 denotes a set of values of roll coordinates between −2.5 mm and +2.5 mm.

To simplify the description, as shown in FIG. 13, some areas are predefined in the plane comprising a pitch axis Y and a roll axis X:
  a) a fifth area Z5 defines the area for which the pitch coordinate is less than the minimum value of the first predetermined range P1 and the roll coordinate is greater than the maximum value of the third predetermined range P3,
  b) a sixth area Z6 defines the area for which the pitch coordinate is greater than the maximum value of the first predetermined range P1 and the roll coordinate is greater than the maximum value of the third predetermined range P3,
  c) a seventh area Z7 defines the area for which the pitch coordinate is less than the minimum value of the first predetermined range P1 and the roll coordinate is less than the minimum value of the third predetermined range P3,
  d) an eighth area Z8 defines the area for which the pitch coordinate is greater than the maximum value of the first predetermined range P1 and the roll coordinate is less than the minimum value of the third predetermined range P3.

The wheel 10 exhibits an alignment anomaly when, in a top view of the vehicle 1, the projection of the plane of the wheel 10 in the plane defined by the pitch axis Y and the roll axis X, provided that this projection is a straight line, forms an angle $\omega$ with the roll axis X.

Thus the computer 30 is configured for detecting an alignment anomaly of a wheel 10 if:
  a) at least one position of the sensor 20 fitted in the wheel 10 is located in the fifth area Z5, and at least one position of the sensor 20 is located in the eighth area Z8, and no position is located in the sixth area Z6 or the seventh area Z7,
or
  b) at least one position of the sensor 20 fitted in the wheel 10 is located in the sixth area Z6, and at least one position of the sensor 20 is located in the seventh area Z7, and no position is located in the fifth area Z5 or the eighth area Z8.

The computer 30 is also configured for warning the driver of the detection of an alignment anomaly. More precisely, the computer 30 is configured for giving a warning indicating the wheel(s) 10 in which an alignment anomaly has been detected.

Notably, the computer 30 warns the driver by sending a warning message such as an audible signal in the interior of the vehicle 1, or by displaying a light signal, on the instrument panel for example, visible to the driver.

The computer is also configured for determining whether the alignment angle $\omega$ of the detected alignment anomaly is positive or negative.

Figure 14:
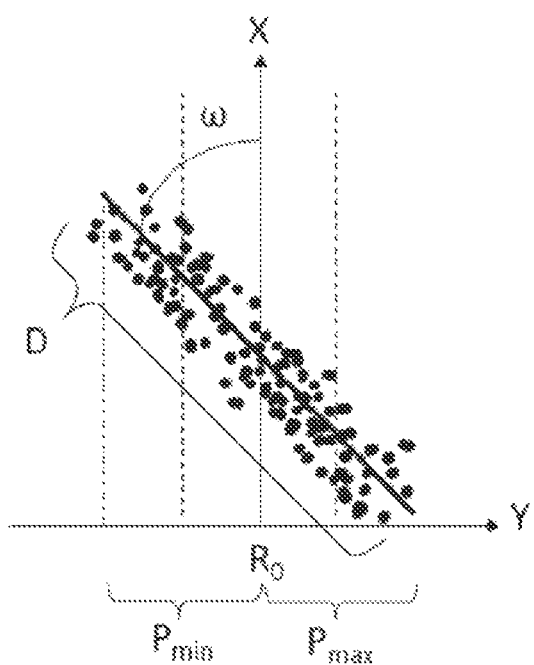
FIG. 14 depicts a plurality of positions, different from the plurality of positions depicted in FIG. 13, in a plane defined by a pitch axis and a roll axis, relative to a predetermined reference, according to an aspect of the invention.

As explained above, the alignment angle $\omega$ of a wheel 10 of the vehicle 1 denotes the angle between the projection of the plane of the wheel 10, in the plane defined by the pitch axis Y and the roll axis X, and the roll axis X, as shown in FIG. 14.

Figure 1:
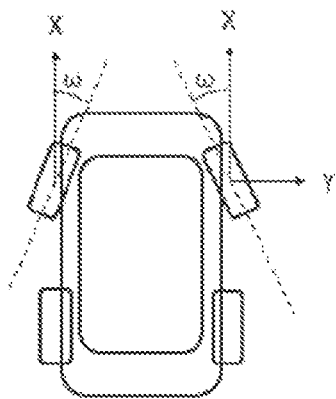
FIG. 1 depicts a top view of a vehicle exhibiting an alignment anomaly.
Figure 2:
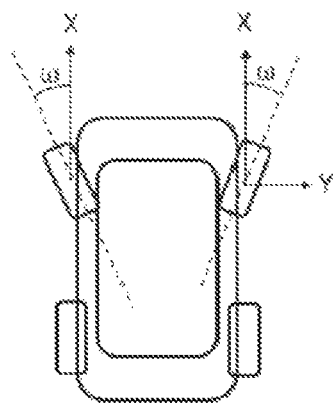
FIG. 2 depicts a top view of a vehicle exhibiting another form of alignment anomaly.

The alignment angle $\omega$ is positive if the front of the wheel 10 is oriented toward the outside of the vehicle 1 (as shown in FIG. 2), and the alignment angle $\omega$ is negative if the front of the wheel 10 is oriented toward the inside of the vehicle 1 (as shown in FIG. 1).

Regarding the left-hand side wheels 10 of the vehicle 1, the computer 30 is configured for determining that the alignment angle $\omega$ is positive if at least one position of the sensor 20 fitted in the wheel 10 is located in the fifth area Z5 and at least one position of the sensor 20 is located in the eighth area Z8 (and no position is located in the sixth area Z6 or the seventh area Z7).

Also regarding the left-hand side wheels 10 of the vehicle 1, the computer 30 is configured for determining that the alignment angle $\omega$ is negative if at least one position of the sensor 20 fitted in the wheel 10 is located in the sixth area Z6 and at least one position of the sensor 20 is located in the seventh area Z7 (and no position is located in the fifth area Z5 or the eighth area Z8).

Regarding the right-hand side wheels 10 of the vehicle 1, the computer 30 is configured for determining that the alignment angle $\omega$ is positive if at least one position of the sensor 20 fitted in the wheel 10 is located in the sixth area Z6 and at least one position of the sensor 20 is located in the seventh area Z7 (and no position is located in the fifth area Z5 or the eighth area Z8).

Also regarding the right-hand side wheels 10 of the vehicle 1, the computer 30 is configured for determining that the alignment angle $\omega$ is positive if at least one position of the sensor 20 fitted in the wheel 10 is located in the fifth area Z5 and at least one position of the sensor 20 is located in the eighth area Z8 (and no position is located in the sixth area Z6 or the seventh area Z7).

The computer 30 is also configured for indicating to the driver whether alignment angle $\omega$ is positive or negative. More precisely, the computer 30 is configured for giving a warning indicating the wheel(s) 10 for which the alignment angle $\omega$ is positive or negative, notably via an indicator light, on the instrument panel for example, visible to the driver.

The computer 30 is also configured for determining the value of the alignment angle $\omega$ of a wheel 10 of the vehicle 1 as shown in FIG. 14.

For this purpose, the computer 30 is configured for modeling, in the plane defined by the pitch axis Y and the roll axis X, a segment representing an estimate of the variation of the roll coordinate of the sensor 20 on the basis of the pitch coordinate of the sensor 20, using the pitch coordinates and the roll coordinates determined by the computer 30.

In other words, the computer 30 is configured for representing the position of the sensor 20 in the plane defined by the pitch axis Y and the roll axis X, each position being defined by a pitch coordinate and a roll coordinate determined by the computer 30.

The computer 30 may use a linear regression model for this purpose.

The segment thus modeled represents the projection of the plane of the wheel 10 in the plane comprising the pitch axis Y and the roll axis X.

The computer 30 knows the length of the modeled segment, which corresponds to the diameter D of the wheel 10.

Since the computer 30 has modeled the segment, said computer 30 also knows the value of the minimum pitch coordinate Pmin and the maximum pitch coordinate Pmax on said modeled segment.

Thus, on the basis of the diameter D and the minimum pitch coordinate Pmin or the maximum pitch coordinate Pmax, the computer 30 is configured for determining the value of the alignment angle ω, notably on the basis of the following equality:

$$\omega = \arcsin\left(\frac{P_{min}}{\frac{D}{2}}\right) \quad \text{[Math 3]}$$

or $$\omega = \arcsin\left(\frac{P_{max}}{\frac{D}{2}}\right). \quad \text{[Math 4]}$$

The computer 30 is also configured for giving the driver the value of the alignment angle ω. More precisely, the computer 30 is configured for giving the value of the alignment angle ω for each wheel 10 exhibiting an alignment anomaly, via an indicator light, displayed on the instrument panel for example, visible to the driver.

Figure 15:
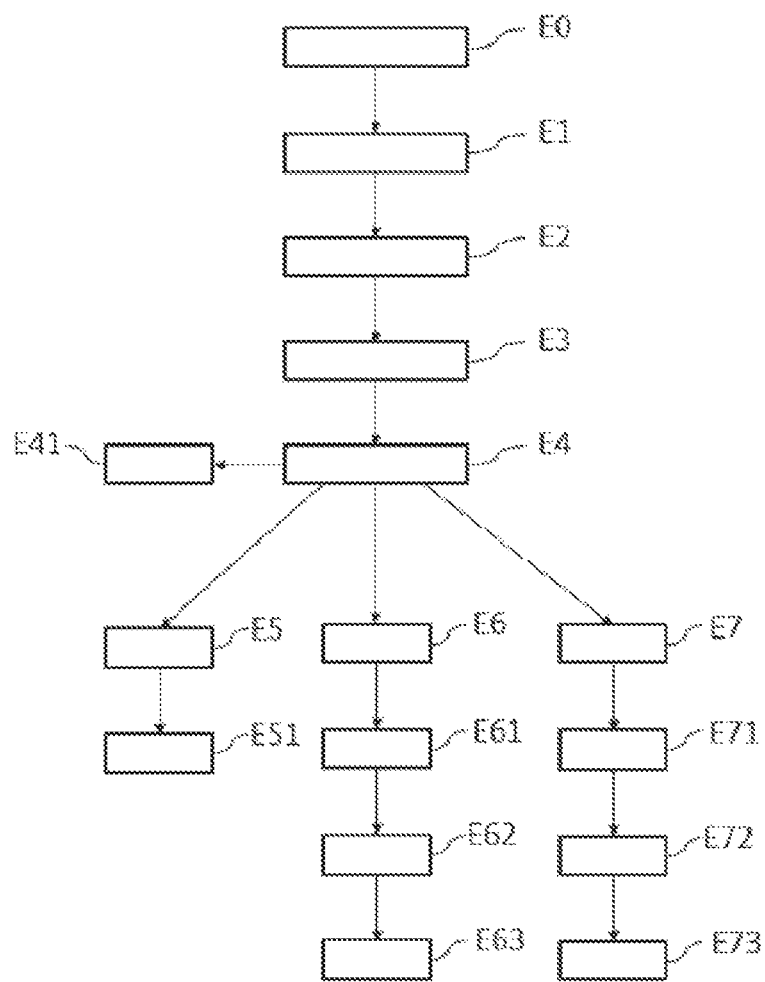
FIG. 15 shows the method according to an aspect of the invention.

With reference to FIG. 15, one embodiment of the method according to an aspect of the invention, implemented by a computer 30 in a vehicle 1 as described above, will now be presented.

In order to simplify the description of the method, since all the sensors 20 are identical and therefore operate in the same manner, the case of a vehicle 1 in which a single wheel 10 comprises a sensor 20 will be considered. Similarly, since the second sensors are identical, the vehicle 1 also comprises a single second sensor fitted in the vehicle 1, so that the second sensor is configured for measuring at least one value of the yaw parameter relating to said sensor 20.

The method comprises a step E0 of measuring at least one pitch parameter value, at least one yaw parameter value and at least one roll parameter value of the wheel 10 in rotation.

According to a first embodiment, the sensor 20 fitted in the wheel 10 measures the at least one pitch parameter, yaw parameter and roll parameter value.

According to a second embodiment, the sensor 20 measures the at least one pitch parameter and roll parameter value, and the second sensor measures the at least one yaw parameter value.

Each pitch parameter, yaw parameter or roll parameter value is also associated with an identifier enabling the computer 30 to identify the sensor 20, or the second sensor, from which said parameter value has been sent.

The method then comprises a step E1 of sending the at least one pitch parameter value, the at least one yaw parameter value and the at least one roll parameter value measured to the computer 30.

Thus, according to the first embodiment, the sensor 20 sends the at least one pitch parameter value, the at least one yaw parameter value and the at least one roll parameter value measured to the computer 30.

According to the second embodiment, the sensor 20 sends the at least one pitch parameter and the at least one roll parameter value measured to the computer 30, and the second sensor sends the at least one yaw parameter value measured to the computer 30.

The method then comprises a step E2 of receiving by the computer 30 the at least one pitch parameter value, the at least one yaw parameter value and the at least one roll parameter value.

The method then comprises a step of identifying the origin of each parameter value received, in which step the computer 30 identifies the sensor 20, or second sensor, that has sent the received pitch parameter, yaw parameter or roll parameter value. For this purpose, the computer 30 uses the identifier associated with the value of the pitch, yaw or roll parameter received. In other words, the computer 30 is configured for identifying the wheel 10 of the vehicle 1 from which the received value of the pitch parameter, the yaw parameter or the roll parameter has originated.

The method comprises a step E3 of determining the pitch, yaw and roll coordinates on the basis of the values of pitch, yaw and roll parameters received.

Additionally, again with reference to FIG. 6 and/or FIG. 9, for each pitch parameter value received, the computer 30 determines a pitch coordinate of the sensor 20 relative to the predetermined reference R0, on the basis of the pitch parameter value received.

Similarly, with reference to FIG. 7 and/or FIG. 9, for each yaw parameter value received, the computer 30 is configured for determining the yaw coordinate of the sensor 20 relative to the predetermined reference R0, on the basis of the yaw parameter value sent by the sensor 20 or the second sensor.

Finally, with reference to FIG. 8 and/or FIG. 9, for each roll parameter value received, the computer 30 determines the roll coordinate of the sensor 20 relative to the predetermined reference R0, on the basis of the roll parameter value sent by the sensor 20.

With reference to FIG. 10, the method then comprises a step E4 of detecting a geometric anomaly in the wheel 10 of the vehicle 1 comprising the sensor 20, if at least one determined pitch coordinate of the sensor 20 fitted in said wheel 10 is outside a first predetermined range P1.

Following said step E4 of detecting a geometric anomaly, the method may comprise a step E41 of warning of a geometric anomaly, in which the driver receives a warning message sent by the computer 30, signifying the presence of a geometric anomaly in the wheel 10 of the vehicle 1 concerned. Said warning message may be a sound signal, for example, given via a loudspeaker of the vehicle 1, or a light signal displayed on the instrument panel of the vehicle 1 and visible to the driver.

After the detection of a geometric anomaly, the method comprises a step E5 of detecting a tightening anomaly of said wheel 10 on the basis of at least two positions of the sensor 20, each position being defined in the plane comprising the pitch axis Y and the yaw axis Z by a pitch coordinate and a yaw coordinate which have been determined.

More precisely, with reference to FIG. 11, a tightening anomaly is detected by the computer 30 if:

a) at least one position of the sensor 20 fitted in the wheel 10 is located in the first area Z1 and at least one position of the sensor 20 is located in the second area Z2, or b) at least one position of the sensor 20 fitted in the wheel 10 is located in the third area Z3 and at least one position of the sensor 20 is located in the fourth area Z4, or c) at least one position of the sensor fitted in the wheel 10 is located in the first area Z1 and at least one position of the sensor 20 is located in the third area Z3, or d) at least one position of the sensor 20 fitted in the wheel 10 is located in the second area Z2 and at least one position of the sensor 20 is located in the fourth area Z4, After the step E5 of detecting a tightening anomaly, the method may comprise a warning step E51, in which the driver receives a warning message sent by the computer 30, signifying the presence of a tightening anomaly in the wheel 10 of the vehicle 1 concerned. Said warning message may be a sound signal, for example, given via a loudspeaker of the vehicle 1, or a light signal displayed on the instrument panel of the vehicle 1 and visible to the driver.

After the step E4 of detecting a geometric anomaly, the method may comprise a step E6 of detecting a camber anomaly of said wheel 10 on the basis of at least two positions of the sensor 20, each position being defined in the plane comprising the pitch axis Y and the yaw axis Z by a pitch coordinate and a yaw coordinate which have been determined.

Notably, in this step, the computer 30 detects a camber anomaly of the wheel 10 if:

a) at least one position of the sensor 20 fitted in the wheel 10 is located in the first area Z1, and at least one position of the sensor 20 is located in the fourth area Z4, and no position is located in the second area Z2 or the third area Z3, or b) at least one position of the sensor 20 fitted in the wheel 10 is located in the second area Z2, and at least one position of the sensor 20 is located in the third area Z3, and no position is located in the first area Z1 or the fourth area Z4.

After the step E6 of detecting a tightening anomaly, the method may comprise a warning step E61, in which the driver receives a warning message sent by the computer 30, signifying the presence of a tightening anomaly in the wheel 10 of the vehicle 1 concerned. Said warning message may be a sound signal, for example, given via a loudspeaker of the vehicle 1, or a light signal displayed on the instrument panel of the vehicle 1 and visible to the driver.

After step E6 of detecting a camber anomaly, or after the warning step E61, the method comprises a step E62 of determining the type of camber anomaly; in other words, in this step, the computer 30 determines whether the camber angle θ is positive or negative.

In this step, regarding the left-hand side wheels 10 of the vehicle 1, the computer 30 determines that the camber angle θ is positive if at least one position of the sensor 20 fitted in the wheel 10 is located in the first area Z1 and at least one position of the sensor 20 is located in the fourth area Z4 (and no position is located in the second area Z2 or the third area Z3).

Also regarding the left-hand side wheels 10 of the vehicle 1, the computer 30 determines that the camber angle θ is negative if at least one position of the sensor 20 fitted in the wheel 10 is located in the second area Z2 and at least one position of the sensor 20 is located in the third area Z3 (and no position is located in the first area Z1 or the fourth area Z4).

Regarding the right-hand side wheels 10 of the vehicle 1, the computer 30 determines that the camber angle θ is positive if at least one position of the sensor 20 fitted in the wheel 10 is located in the second area Z2 and at least one position of the sensor 20 is located in the third area Z3 (and no position is located in the first area Z1 or the fourth area Z4).

Also regarding the right-hand side wheels 10 of the vehicle 1, the computer 30 determines that the camber angle θ is negative if at least one position of the sensor 20 fitted in the wheel 10 is located in the first area Z1 and at least one position of the sensor 20 is located in the fourth area Z4 (and no position is located in the second area Z2 or the third area Z3).

After the step E62 of determining the type of camber angle, the method comprises a step of indicating to the driver the type of camber angle θ. More precisely, the computer 30 indicates the wheel(s) 10 for which the camber angle θ is positive or negative, notably via an indicator light, on the instrument panel for example, visible to the driver.

After step E6 of detecting a camber anomaly, or after step E62 of detecting the type of camber angle, the method comprises a step E63 of determining the value of the camber angle.

In this step, the computer 30 models, in the plane defined by the pitch axis Y and the yaw axis Z, a segment representing an estimate of the variation of the yaw coordinate of the sensor 20 on the basis of the pitch coordinate of the sensor 20, using the pitch coordinates and the yaw coordinates determined by the computer 30. In other words, the computer 30 models the projection of the plane of the wheel 10 in the plane defined by the pitch axis Y and the yaw axis Z.

Thus, with reference to FIG. 12, on the basis of the diameter D and the minimum pitch coordinate Pmin or the maximum pitch coordinate Pmax, the computer 30 is configured for determining the value of the camber angle θ, notably on the basis of the following equality:

$$\theta = \arcsin\left(\frac{P_{min}}{\frac{D}{2}}\right) \qquad \text{[Math 1]}$$

or $$\theta = \arcsin\left(\frac{P_{max}}{\frac{D}{2}}\right). \qquad \text{[Math 2]}$$

After step E63 of determining the value of the camber angle, the method comprises a step of indicating to the driver the value of the camber angle θ. More precisely, the computer 30 indicates the camber angle value θ for each wheel 10 exhibiting a camber anomaly.

After the step E4 of detecting a geometric anomaly, the method may comprise a step E7 of detecting an alignment anomaly of said wheel 10 on the basis of at least two positions of the sensor 20, each position being defined in the plane comprising the pitch axis Y and the roll axis X by a pitch coordinate and a roll coordinate which have been determined.

With reference to FIG. 13, in this step the computer 30 detects an alignment anomaly of the wheel 10 if:

a) at least one position of the sensor 20 fitted in the wheel 10 is located in the fifth area Z5, and at least one coordinate of the sensor 20 is located in the eighth area Z8, and no position is located in the sixth area Z6 or the seventh area Z7, or b) at least one position of the sensor 20 fitted in the wheel 10 is located in the sixth area Z6, and at least one coordinate of the sensor 20 is located in the seventh area Z7, and no position is located in the fifth area Z5 or the eighth area Z8.

After the step E7 of detecting an alignment anomaly, the method may comprise a warning step E71, in which the driver receives a warning message sent by the computer 30, signifying the presence of an alignment anomaly in the wheel 10 of the vehicle 1 concerned. The warning message may be a sound signal, for example, given via a loudspeaker of the vehicle 1, or a light signal displayed on the instrument panel of the vehicle 1 and visible to the driver.

After step E7 of detecting an alignment anomaly, the method comprises a step E72 of determining the type of alignment angle; in other words, in this step, the computer 30 determines whether the alignment angle ω is positive or negative.

Notably, in this step, regarding the left-hand side wheels 10 of the vehicle 1, the computer 30 determines that the alignment angle ω is positive if at least one position of the sensor 20 fitted in the wheel 10 is located in the fifth area Z5 and at least one position of the sensor 20 is located in the eighth area Z8 (and no position is located in the sixth area Z6 or the seventh area Z7).

Also regarding the left-hand side wheels 10 of the vehicle 1, the computer 30 determines that the alignment angle ω is negative if at least one position of the sensor 20 fitted in the wheel 10 is located in the sixth area Z6 and at least one position of the sensor 20 is located in the seventh area Z7 (and no position is located in the fifth area Z5 or the eighth area Z8).

Regarding the right-hand side wheels 10 of the vehicle 1, the computer 30 determines that the alignment angle ω is positive if at least one position of the sensor 20 fitted in the wheel 10 is located in the sixth area Z6 and at least one position of the sensor 20 is located in the seventh area Z7 (and no position is located in the fifth area Z5 or the eighth area Z8).

Also regarding the right-hand side wheels 10 of the vehicle 1, the computer 30 determines that the alignment angle ω is positive if at least one position of the sensor 20 fitted in the wheel 10 is located in the fifth area Z5 and at least one position of the sensor 20 is located in the eighth area Z8 (and no position is located in the sixth area Z6 or the seventh area Z7).

After the step E72 of determining the type of alignment angle, the method comprises a step of indicating to the driver the type of alignment angle ω. More precisely, the computer 30 indicates the wheel(s) 10 for which the alignment angle ω is positive or negative, notably via an indicator light, on the instrument panel for example, visible to the driver.

After step E7 of detecting an alignment anomaly, or after step E72 of detecting the type of alignment angle, the method comprises a step E73 of determining the value of the alignment angle.

In this step, the computer 30 models, in the plane defined by the pitch axis Y and the roll axis X, a segment representing an estimate of the variation of the roll coordinate of the sensor 20 on the basis of the pitch coordinate of the sensor 20, using the pitch coordinates and the roll coordinates determined by the computer 30. In other words, the computer 30 models the projection of the plane of the wheel 10 in the plane defined by the pitch axis Y and the roll axis Z.

Thus, with reference to FIG. 14, on the basis of the diameter D and the minimum pitch coordinate Pmin or the maximum pitch coordinate Pmax, the computer 30 is configured for determining the value of the alignment angle ω, notably on the basis of the following equality:

$$\omega = \arcsin\left(\frac{P_{min}}{\frac{D}{2}}\right) \quad \text{[Math 3]}$$

or $$\omega = \arcsin\left(\frac{P_{max}}{\frac{D}{2}}\right). \quad \text{[Math 4]}$$

After step E73 of determining the value of the alignment angle, the method comprises a step of indicating to the driver the value of the alignment angle ω. More precisely, the computer 30 gives the value of the alignment angle ω for each wheel 10 exhibiting an alignment anomaly.

Evidently, if the vehicle 1 comprises a plurality of second sensors and/or if a plurality of wheels 10 comprise a sensor 20, the method is reiterated for each sensor 20 or for each assembly, comprising a sensor 20 and a second sensor, associated with a wheel 10.

Thus the computer 30, the sensor 20, or the sensor 20 and the second sensor, and the method as described above may be used to detect a geometric anomaly in at least one wheel 10 of the vehicle 1, and notably to define the type of geometric anomaly as tightening, camber and/or alignment.

The computer 30 and the method according to an aspect of the invention also enable the driver to be warned if a geometric anomaly is detected. Thus the driver and/or the owner of the vehicle 1 can know when an intervention by a qualified person is necessary to remedy the at least one geometric anomaly detected.

The invention claimed is:

1. A computer for a motor vehicle, said vehicle comprising a plurality of wheels enabling the vehicle to move on a road, at least one of said wheels comprising a wheel sensor for measuring at least one value of a "pitch" parameter of the wheel, enabling the computer to determine a "pitch" coordinate of said wheel sensor along a predetermined "pitch" axis of the wheel orthogonal to a direction of movement of the vehicle and parallel to the plane of the road, relative to a predetermined reference of said pitch axis of the wheel, the computer being capable of:

a) receiving from the wheel sensor at least one value of the at least one pitch parameter of the wheel, b) determining at least one pitch coordinate of the wheel sensor relative to the predetermined reference of the pitch axis of the wheel on the basis of the at least one value received, c) detecting a geometric anomaly in the wheel including said wheel sensor when at least one determined pitch coordinate is outside a first predetermined range of values of coordinates on the pitch axis, centered on the predetermined reference of said pitch axis of the wheel between a minimum and a maximum, and d) warning the driver of the vehicle, by sending a warning message, when an anomaly in the wheel has been detected.

2. The computer as claimed in claim 1, wherein the wheel sensor comprises an acceleration sensor.

3. A vehicle comprising a plurality of wheels enabling the vehicle to move on a road, said vehicle comprising a computer as claimed in claim 1, at least one of said wheels comprising a wheel sensor for measuring at least one "pitch" parameter of the wheel, enabling the computer to determine the "pitch" coordinate of said wheel sensor along a predetermined "pitch" axis of the wheel orthogonal to the direction of movement of the vehicle and parallel to the plane of the road, relative to a predetermined reference of said pitch axis of the wheel.

4. A method for detecting a geometric anomaly of a wheel of a vehicle, implemented by a computer as claimed in claim 1, the method comprising:
   a) receiving at least one value of the at least one pitch parameter of the wheel sent by at least one wheel sensor,
   b) determining at least one pitch coordinate of the wheel relative to the predetermined reference of the pitch axis of the wheel on the basis of the at least one value received,
   c) detecting a geometric anomaly in the wheel including said wheel sensor when at least one determined pitch coordinate of the wheel is outside a first predetermined range of values of coordinates on the pitch axis of the wheel, centered on the predetermined reference of said pitch axis of the wheel,
   d) warning, by sending a warning message to the driver of the vehicle, when an anomaly in the wheel has been detected.

5. A non-transitory computer program product, comprising a set of program code instructions that, when executed by one or more processors, configure the one or more processors to implement a method as claimed in claim 4.

6. A computer for a motor vehicle, said vehicle comprising a plurality of wheels enabling the vehicle to move on a road, at least one of said wheels comprising a sensor for measuring at least two pitch parameter values and at least two values of a "yaw" parameter, each yaw parameter value enabling the computer to determine a "yaw" coordinate of said sensor along a predetermined "yaw" axis orthogonal to a direction of movement of the vehicle and orthogonal to a plane of the road relative to a predetermined reference of said yaw axis, and the computer is capable of:
   a) receiving from the sensor at least two values of the pitch parameter and at least two values of the yaw parameter,
   b) determining at least two pitch coordinates based on the at least two pitch parameter values received and at least two yaw coordinates based on the at least two yaw parameter values received,
   c) defining at least two positions of the sensor, each position being defined in the plane including the pitch axis and the yaw axis by a pitch coordinate and a yaw coordinate which have been determined,
   d) detecting an anomaly of the wheel comprising said sensor, when:
   i) at least one position is defined such that its pitch coordinate is greater than the maximum of the first predetermined range and its yaw coordinate is greater than the maximum of a second predetermined range of coordinate values on the yaw axis, centered on the center of the wheel between a minimum and a maximum, and
   at least one position is defined such that its pitch coordinate is less than the minimum of the first predetermined range and its yaw coordinate is greater than the maximum of the second predetermined range,
   or:
   ii) at least one position is defined such that its pitch coordinate is greater than the maximum of the first predetermined range and its yaw coordinate is less than the minimum of a second predetermined range of coordinate values on the yaw axis, centered on the center of the wheel between a minimum and a maximum, and
   at least one position is defined such that its pitch coordinate is less than the minimum of the first predetermined range and its yaw coordinate is less than the minimum of the second predetermined range.

7. The computer as claimed in claim 6, the computer being configured for detecting a camber anomaly of the wheel including said sensor when:
   i) at least one position is defined such that its pitch coordinate is greater than the maximum of the first predetermined range and its yaw coordinate is greater than the maximum of the second predetermined range, and
   at least one position is defined such that its pitch coordinate is less than the minimum of the first predetermined range and its yaw coordinate is less than the minimum of the second predetermined range,
   or:
   ii) at least one position is defined such that its pitch coordinate is greater than the maximum of the first predetermined range and its yaw coordinate is less than the minimum of the second predetermined range, and
   at least one position is defined such that its pitch coordinate is less than the minimum of the first predetermined range and its yaw coordinate is greater than the maximum of the second predetermined range.

8. The computer as claimed in claim 6, wherein the anomaly is a tightening anomaly.

9. The computer as claimed in claim 6, wherein the computer is further capable of warning the driver of the vehicle, by sending a warning message, when an anomaly in the wheel has been detected.

10. A computer for a motor vehicle, said vehicle comprising a plurality of wheels enabling the vehicle to move on a road, at least one of said wheels comprising a sensor for measuring at least two pitch parameter values, the vehicle comprising at least a second sensor, each second sensor being fitted facing a wheel including a sensor and being configured for measuring at least two values of a "yaw" parameter, each yaw parameter value enabling the computer to determine a "yaw" coordinate of said sensor along a predetermined "yaw" axis orthogonal to a direction of movement of the vehicle and orthogonal to a plane of the road relative to a predetermined reference of said yaw axis, and the computer being capable of:
   a) receiving at least two values of the pitch parameter from the sensor and at least two values of the yaw parameter from the second sensor,
   b) determining at least two pitch coordinates based on the at least two pitch parameter values received and at least two yaw coordinates based on the at least two yaw parameter values received,
   c) defining at least two positions of the sensor, each position being defined in the plane including the pitch axis and the yaw axis by a pitch coordinate and a yaw coordinate which have been determined,
   d) detecting an anomaly of the wheel including said sensor and said second sensor when:

i) at least one position is defined such that its pitch coordinate is greater than the maximum of the first predetermined range and its yaw coordinate is greater than the maximum of a second predetermined range of coordinate values on the yaw axis, centered on the center of the wheel between a minimum and a maximum, and at least one position is defined such that its pitch coordinate is less than the minimum of the first predetermined range and its yaw coordinate is greater than the maximum of the second predetermined range, or:

ii) at least one position is defined such that its pitch coordinate is greater than the maximum of the first predetermined range and its yaw coordinate is less than the minimum of a second predetermined range of coordinate values on the yaw axis, centered on the center of the wheel between a minimum and a maximum, and at least one position is defined such that its pitch coordinate is less than the minimum of the first predetermined range and its yaw coordinate is less than the minimum of the second predetermined range.

11. The computer as claimed in claim 10, the computer being configured for detecting a camber anomaly of the wheel including said sensor when:

i) at least one position is defined such that its pitch coordinate is greater than the maximum of the first predetermined range and its yaw coordinate is greater than the maximum of the second predetermined range, and at least one position is defined such that its pitch coordinate is less than the minimum of the first predetermined range and its yaw coordinate is less than the minimum of the second predetermined range, or:

ii) at least one position is defined such that its pitch coordinate is greater than the maximum of the first predetermined range and its yaw coordinate is less than the minimum of the second predetermined range, and at least one position is defined such that its pitch coordinate is less than the minimum of the first predetermined range and its yaw coordinate is greater than the maximum of the second predetermined range.

12. The computer as claimed in claim 10, wherein the second sensor is a sensor of the rotation speed of the wheel.

13. The computer as claimed in claim 10, wherein the anomaly is a tightening anomaly.

14. The computer as claimed in claim 10, wherein the computer is further capable of warning the driver of the vehicle, by sending a warning message, when an anomaly in the wheel has been detected.

15. A computer for a motor vehicle, said vehicle comprising a plurality of wheels enabling the vehicle to move on a road, at least one of said wheels comprising a sensor for measuring at least two pitch parameter values and at least two values of a "roll" parameter, each roll parameter value enabling the computer to determine a "roll" coordinate of said sensor along a predetermined "roll" axis parallel to a direction of movement of the vehicle relative to a predetermined reference of said roll axis, the computer is capable of:

a) receiving from the sensor at least two values of the pitch parameter and at least two values of the roll parameter, b) determining at least two pitch coordinates based on the at least two pitch parameter values received and at least two roll coordinates based on the at least two roll parameter values received, c) defining at least two positions of the sensor, each position being defined in the plane including the pitch axis and the roll axis by a pitch coordinate and by a roll coordinate which have been determined, d) detecting an anomaly of the wheel comprising said sensor, when:

i) at least one position is defined such that its pitch coordinate is greater than the maximum of the first predetermined range and its roll coordinate is greater than the maximum of a third predetermined range of coordinate values on the roll axis, centered on the center of the wheel between a minimum and a maximum, and at least one position is defined such that its pitch coordinate is less than the minimum of the first predetermined range and its roll coordinate is less than the minimum of the third predetermined range, or:

ii) at least one position is defined such that its pitch coordinate is greater than the maximum of the first predetermined range and its roll coordinate is less than the minimum of a third predetermined range of coordinate values on the roll axis, centered on the center of the wheel between a minimum and a maximum, and at least one position is defined such that its pitch coordinate is less than the minimum of the first predetermined range and its roll coordinate is greater than the maximum of the third predetermined range.

16. The computer as claimed in claim 15, wherein the anomaly is a tightening anomaly.

17. The computer as claimed in claim 15, wherein the computer is further capable of warning the driver of the vehicle, by sending a warning message, when an anomaly in the wheel has been detected.

* * * * *